United States Patent
Ochoa et al.

(10) Patent No.: US 10,989,274 B2
(45) Date of Patent: Apr. 27, 2021

(54) SYNCHRONOUS BELT WITH STIFFENED TEETH

(71) Applicant: GATES CORPORATION, Denver, CO (US)

(72) Inventors: Charles F. Ochoa, Columbia, MO (US); Cynthia Decker, Columbia, MO (US); Karla J. Bier, Columbia, MO (US); Jennifer E. Pease, Lakewood, CO (US); Patrick Joseph McNamee, Monument, CO (US)

(73) Assignee: Gates Corporation, Denver, CO (US)

( * ) Notice: Subject to any disclaimer, the term of this patent is extended or adjusted under 35 U.S.C. 154(b) by 422 days.

(21) Appl. No.: 15/965,392

(22) Filed: Apr. 27, 2018

(65) Prior Publication Data

US 2018/0313430 A1 Nov. 1, 2018

Related U.S. Application Data

(60) Provisional application No. 62/490,988, filed on Apr. 27, 2017.

(51) Int. Cl.
*F16G 3/10* (2006.01)
*F16G 1/04* (2006.01)
(Continued)

(52) U.S. Cl.
CPC .............. *F16G 3/10* (2013.01); *B29D 29/08* (2013.01); *F16G 1/04* (2013.01); *F16G 1/10* (2013.01); *F16G 1/28* (2013.01); *F16G 5/20* (2013.01)

(58) Field of Classification Search
CPC ..... F16G 3/10; F16G 1/04; F16G 1/10; F16G 1/28; F16G 5/20; B29D 29/08
See application file for complete search history.

(56) References Cited

U.S. PATENT DOCUMENTS

| 3,250,653 A | 5/1966 | Geist et al. |
| 3,535,946 A | 10/1970 | Miller |

(Continued)

FOREIGN PATENT DOCUMENTS

| CN | 203570919 U | 4/2014 |
| CN | 205226231 U | 5/2016 |

(Continued)

OTHER PUBLICATIONS

European Patent Office, International Search Report and the Written Opinion of the International Searching Authority; application No. PCT/US2018/029917; dated Aug. 3, 2018.

*Primary Examiner* — Michael R Mansen
*Assistant Examiner* — Robert T Reese
(74) *Attorney, Agent, or Firm* — Alyssa K. Sandrowitz, Esq.

(57) ABSTRACT

A synchronous belt with a tensile member layer having a tensile member embedded in an elastomeric body; a toothed surface with a plurality of regularly spaced, transverse teeth protruding from the body; and a jacket covering the toothed surface; wherein the teeth comprise a plurality of fabric insert layers that increase the stiffness of the tooth, the insert layers separated from each other by layers of an elastomer composition. The layers may be oriented parallel to the tensile member layer, perpendicular to the tensile member, or following the contour of the tooth. The layers may be a single piece of fabric folded into layers, or separate pieces of fabric.

10 Claims, 5 Drawing Sheets

(51) Int. Cl.
  *F16G 1/28* (2006.01)
  *B29D 29/08* (2006.01)
  *F16G 1/10* (2006.01)
  *F16G 5/20* (2006.01)

(56) References Cited

U.S. PATENT DOCUMENTS

| | | | |
|---|---|---|---|
| 3,835,720 A | 9/1974 | Fisher et al. | |
| 3,973,894 A | 8/1976 | Lindner et al. | |
| 4,099,422 A * | 7/1978 | Cicognani | B32B 25/10 |
| | | | 474/205 |
| 4,235,119 A | 11/1980 | Wetzel | |
| 4,583,963 A | 4/1986 | Marsh et al. | |
| 4,617,075 A | 10/1986 | Wetzel et al. | |
| 4,626,232 A * | 12/1986 | Witt | F16G 1/28 |
| | | | 474/205 |
| 4,627,828 A * | 12/1986 | Nagai | F16G 1/28 |
| | | | 474/205 |
| 4,741,726 A * | 5/1988 | Zarife | F16G 5/20 |
| | | | 474/268 |
| 4,775,357 A | 10/1988 | Wolfe | |
| 4,895,555 A | 1/1990 | Watanabe et al. | |
| 4,934,992 A | 6/1990 | Simon et al. | |
| 5,322,479 A * | 6/1994 | Le Devehat | F16G 1/28 |
| | | | 474/101 |
| 6,406,397 B1 | 6/2002 | Isshiki et al. | |
| 6,419,775 B1 * | 7/2002 | Gibson | F16G 1/28 |
| | | | 156/137 |
| 6,485,386 B2 | 11/2002 | Yuan et al. | |
| 8,568,260 B2 * | 10/2013 | Baldovino | D02G 3/187 |
| | | | 474/205 |
| 9,353,827 B2 | 5/2016 | Uchigashima et al. | |
| 10,220,545 B2 * | 3/2019 | Lofgren | B29C 70/34 |
| 2002/0015825 A1 * | 2/2002 | Meco | F16G 1/28 |
| | | | 428/172 |
| 2007/0240658 A1 * | 10/2007 | Baldovino | F16G 1/28 |
| | | | 123/90.31 |
| 2014/0080647 A1 * | 3/2014 | Sakamoto | C08L 63/00 |
| | | | 474/205 |
| 2014/0287862 A1 | 9/2014 | Yamada et al. | |
| 2015/0285334 A1 * | 10/2015 | Thomas | F16G 1/10 |
| | | | 474/90 |
| 2018/0229934 A1 * | 8/2018 | Hazim | B65G 15/32 |

FOREIGN PATENT DOCUMENTS

| | | |
|---|---|---|
| FR | 2597564 A2 | 10/1987 |
| JP | 2005264994 A | 9/2005 |
| JP | 2016089996 A | 5/2016 |
| WO | 20120156223 A1 | 11/2012 |

* cited by examiner

SYNCHRONOUS BELT WITH STIFFENED TEETH

BACKGROUND OF THE INVENTION

This invention relates generally to synchronous belts, more particularly to belts with stiffened teeth for increased tooth loads, and specifically to teeth stiffened with multiple fabric inserts.

Synchronous belts, also called toothed belts, timing belts, and positive drive belts, are widely used for mechanical power transmission and synchronization. For example, they are used in automotive valve timing systems, business machines, bicycle and motorcycle drives, and many other applications. In many such applications, it would be advantageous to improve the load capacity of the belt or to reduce the required width of the belt or both. One factor in load capacity is tooth stiffness. The art discloses many approaches to increasing tooth stiffness.

U.S. Pat. No. 4,632,665 discloses a belt with a layer of fabric reinforcement in the body of each tooth, separated from the usual outer tooth covering fabric by a cushion layer of rubber. Both fabrics extend around the entire belt and thus, both fabrics support the cord in the land region, contributing to the location of the pitch line. This may make it difficult to control the location of the pitch line. In manufacturing the belt, the two layers of fabric and the cushion rubber are laid in a mold and preformed into the general shape of the teeth before the tensile member and additional rubber are applied. This is the so-called "preform" method.

U.S. Pat. Nos. 3,535,946, 4,583,963, and 4,626,232, for examples, disclose the use of short fibers in the tooth rubber to stiffen the tooth compound. The tooth compound, or at least a portion thereof, is forced through the tensile member into the grooves of a mold by the pressure of molding to form the fiber-loaded tooth. This is the so-called "flow-through" method. The process is difficult to apply with fiber-loaded compounds because of the increase in viscosity of the compound due to the fibers.

U.S. Pat. No. 4,895,555 discloses a method of making liquefied elastomer belts with a nonwoven fabric thinly compressed under the cord in the land region and diffusely mixed in the tooth parts.

U.S. Pat. No. 6,406,397 discloses a fiber-loaded tooth rubber with the fibers oriented in a regular way. The manufacturing method is the preform method.

SUMMARY

The present invention is directed to systems and methods which provide timing belts with stiffened teeth. With stiffer teeth, a belt may have increased load capacity or reduced timing error or backlash, or the belt may be sized narrower or smaller and still carry the same load.

The invention relates to a synchronous belt with a tensile member layer having a tensile member embedded in an elastomeric body; a toothed surface with a plurality of regularly spaced, transverse teeth protruding from the body; and a jacket covering the toothed surface; wherein the teeth comprise a plurality of fabric insert layers that increase the stiffness of the tooth, the insert layers separated from each other by layers of an elastomer composition. The layers may be oriented generally parallel to the tensile member layer, perpendicular to the tensile member, or following the contour of the tooth. The layers may be a single piece of fabric folded or rolled into layers, or may be separate pieces of fabric.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
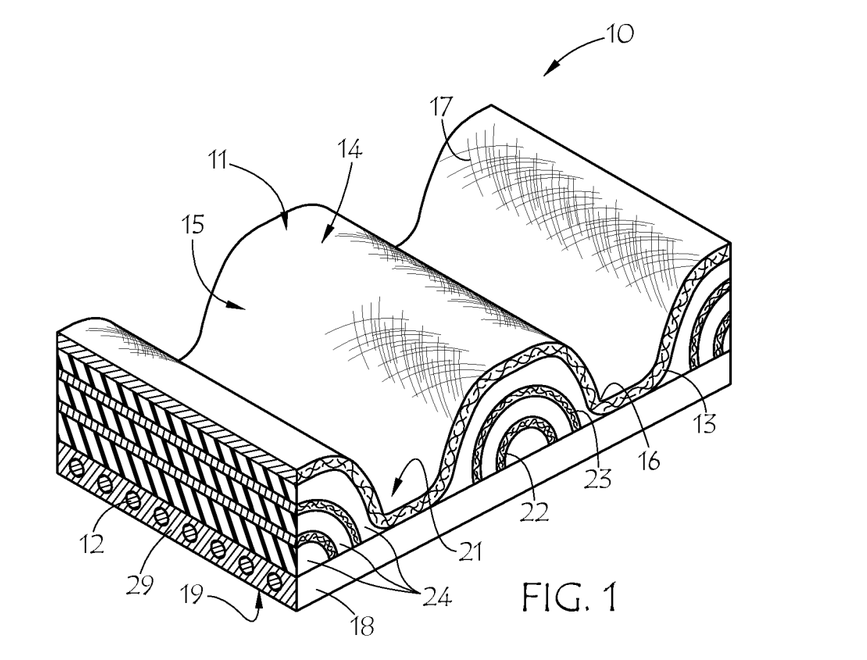
FIG. 1 is a partially fragmented perspective view of an embodiment of the invention.

FIG. 1 shows a first embodiment of the invention. Synchronous belt 10 includes teeth 11 protruding at regular intervals from the tensile layer 18 which includes tensile members or cords 12 embedded in elastomer or rubber 29. The toothed surface or profile includes tooth tip 14, tooth flank 15, tooth root 16 and land 21. The toothed surface of alternating teeth and lands is covered with jacket 13, which may include a fabric and various treatments. Any known woven, nonwoven or knit fabric pattern 17, fabric treatment, tensile member and elastomer or rubber formulation may be utilized in any of the embodiments of the invention. According to this first embodiment of the invention, tooth 11 is stiffened by including two or more fabric inserts 22 and 23 which are embedded in tooth rubber 24, thus separated from each other and from jacket 13 by layers of rubber 24. The formulations for tooth rubber 24, tensile layer rubber, and optional back rubber (not shown) may be the same or different from each other. Fabric inserts 22 and 23 follow the general shape of the tooth, thus being U-shaped. The fabric inserts preferably do not extend into the land 21 region where the space between the cord 12 and jacket 13 must be controlled to maintain a consistent pitch line or neutral axis of the belt. Although two U-shaped fabric insert layers are shown, more than two U-shaped layers may be included.

Figure 2:
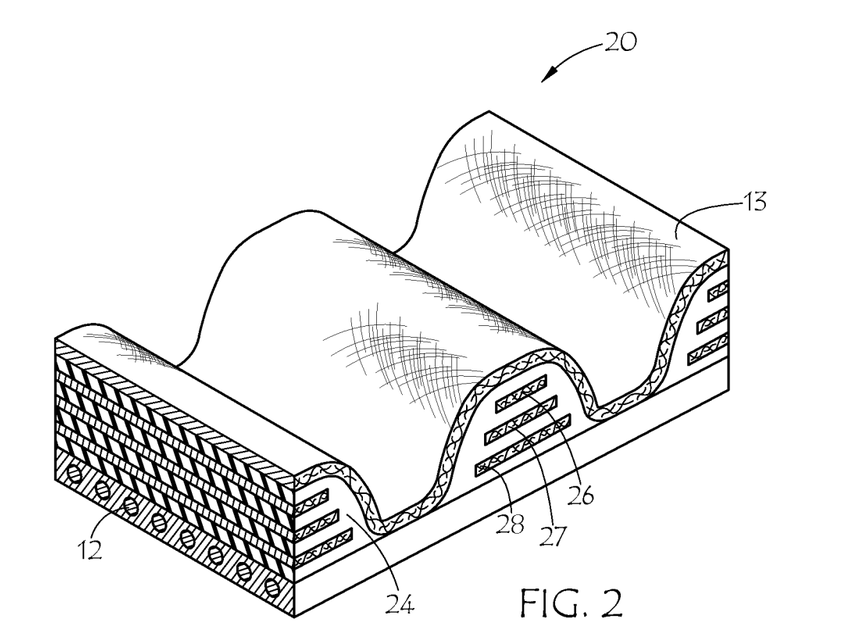
FIG. 2 is a partially fragmented perspective view of a second embodiment of the invention.

FIG. 2 shows a second embodiment of the invention. Synchronous belt 20 includes cords 12 embedded in elastomer or rubber and a toothed surface covered with jacket 13. According to this second embodiment of the invention, the teeth is stiffened by including two or more planar fabric inserts 26, 27, and 28 which are embedded in tooth rubber 24, thus separated from each other and from jacket 13 by layers of rubber 24. Fabric inserts 26-28 follow the general longitudinal direction of the belt, thus being approximately flat or slightly rounded and lying approximately parallel to the belt back surface 19, which is also parallel to the cord 12. The fabric inserts preferably do not extend into the land 21 region where the space between the cord 12 and jacket 13 must be controlled to maintain a consistent pitch line or neutral axis of the belt. Although three planar, horizontal fabric insert layers are shown, two or more horizontal layers may be included.

Figure 3:
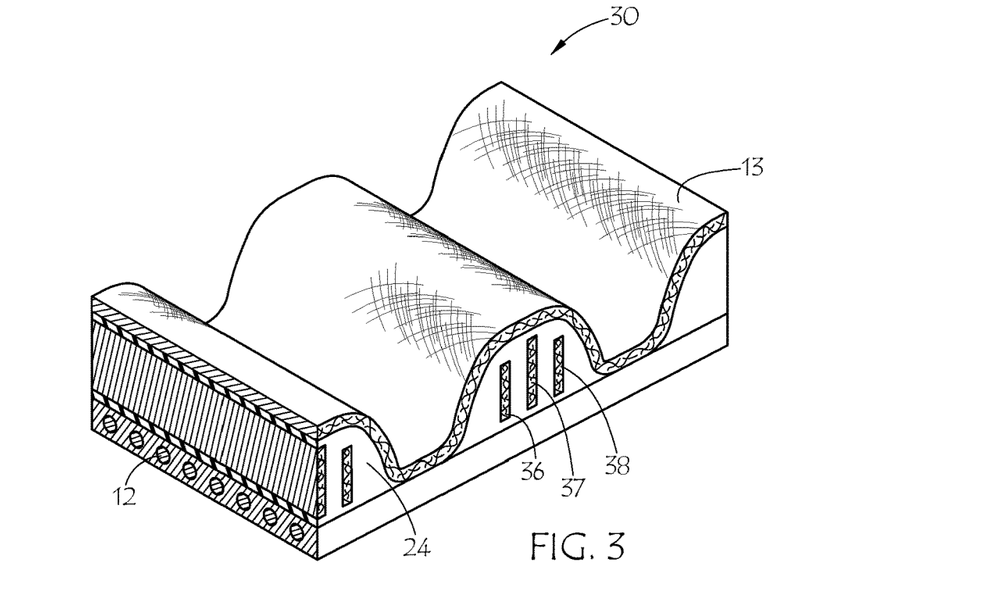
FIG. 3 is a partially fragmented perspective view of a third embodiment of the invention.
Figure 4:
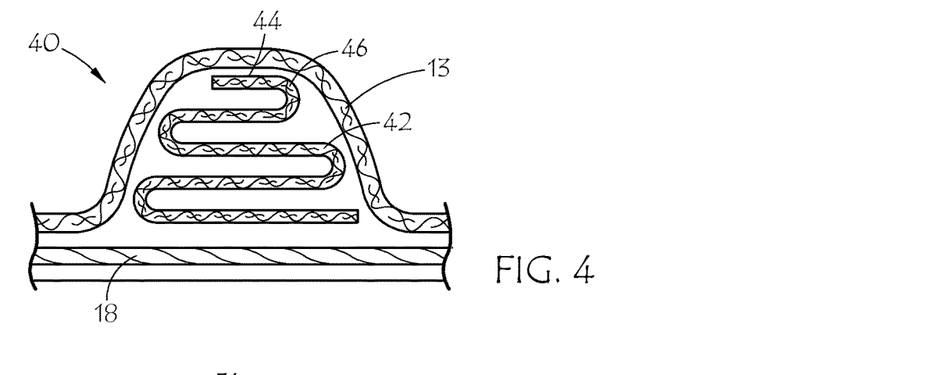
FIG. 4 is a partially fragmented side view of a fourth embodiment of the invention.

FIG. 3 shows a third embodiment of the invention. Synchronous belt 30 includes cords 12 embedded in elastomer or rubber and a toothed surface covered with jacket 13. According to this third embodiment of the invention, the teeth is stiffened by including multiple fabric inserts 36, 37, and 38 which are embedded in tooth rubber 24, thus separated from each other and from jacket 13 by layers of rubber 24. Fabric inserts 36-38 are aligned with the protruding direction of the teeth, that is, perpendicular to the cords 12. The fabric inserts preferably do not extend into the land 21 region where the space between the cord 12 and jacket 13 must be controlled to maintain a consistent pitch line or neutral axis of the belt. Fabric inserts 36 and 38 may be inclined from perpendicular, lying approximately parallel to the tooth flank surface of the nearest tooth flanks 15. The central fabric insert 37 is generally perpendicular to cord 12. Although three planar, vertical fabric insert layers are shown, two or more vertical layers may be included.

The insert fabrics may be the same or different, as each other or as the tooth fabric. Thus any of the fabrics may be woven, knit, or nonwoven, of any suitable weave or material. For example, the fabrics may comprise natural or synthetic fibers, or blends thereof, including polyesters, nylons, cotton, aramids, acrylics, vinylon, rayon, acetate, glass, carbon, metal, etc. It is desirable to have good adhesion between the fabrics and the rubber or between fibers, so one or more adhesive treatment or binder treatment may be necessary. RFL treatments, rubber cements, or other latex-based treatments may be used. Pretreatments or sizes or finishes on the fabric may be useful, such as isocyanates, epoxies, urethanes, or the like.

FIGS. 4-7 illustrate other embodiments in which a plurality of fabric insert layers are formed by folding a single piece of fabric. If the fabric is coated with rubber on one or both sides, the folding will result in layers of fabric and rubber useful for reinforcing the belt teeth. The rubber layer may be the same or different than the rest of the tooth rubber or the rubber coating the jacket. The tooth 40 embodiment of FIG. 4 includes a one-piece fabric insert 42 with a plurality of horizontal layers 44 as in FIG. 2, but connected by folds 46 in the one piece of fabric.

Figure 5:
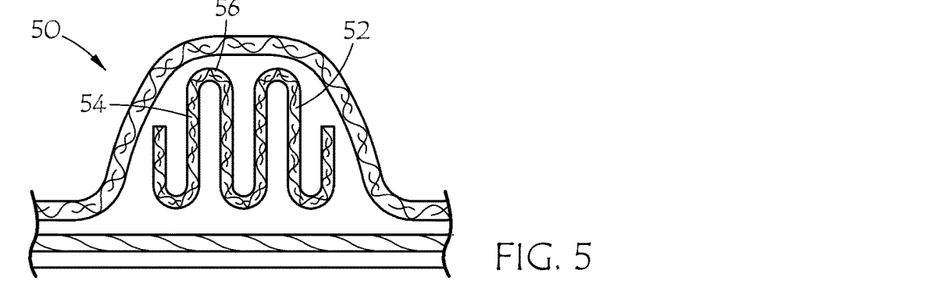
FIG. 5 is a partially fragmented side view of a fifth embodiment of the invention.

The tooth 50 embodiment of FIG. 5 includes a one-piece fabric insert 52 with a plurality of vertical layers 54 as in FIG. 3, but connected by folds 56 in the one piece of fabric.

Figure 6:
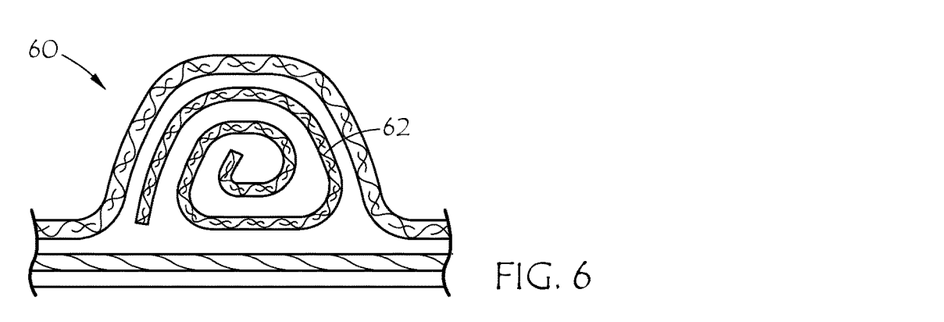
FIG. 6 is a partially fragmented side view of a sixth embodiment of the invention.

The tooth 60 embodiment of FIG. 6 includes a one-piece fabric insert 62 with a plurality of spiraled layers 44 in the one piece of fabric.

Figure 7:
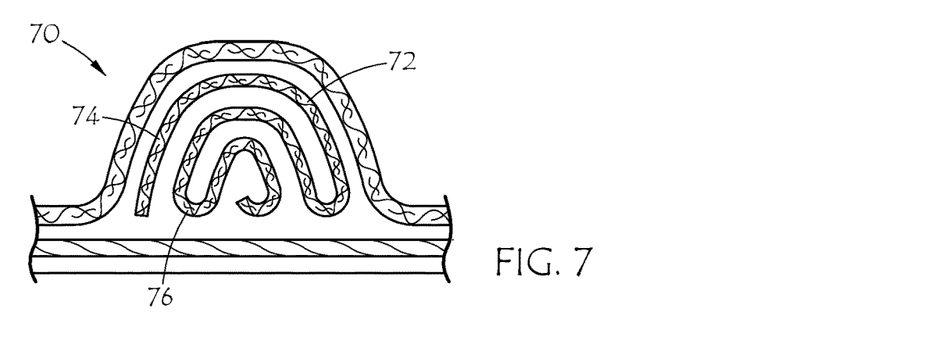
FIG. 7 is a partially fragmented side view of a seventh embodiment of the invention.

The tooth 70 embodiment of FIG. 7 includes a one-piece fabric insert 72 with a plurality of U-shaped (or inverted U-shaped) layers 74 as in FIG. 1, but connected by folds 76 in the one piece of fabric.

The fabric inserts or insert layers are not limited to the specific number, sizes and shapes illustrated herein. For example, the inserts of the first embodiment may be more than two or three in number. With thinner insert fabrics, more layers can be incorporated while maintaining some suitable, thin rubber layers there between. The inserts may be spaced apart from each other or from the jacket or tensile member. The inserts or one or more of them maybe be adjacent to or in contact with the jacket, another insert, or the tensile member. The inserts may be made by treating a base fabric with dips, coatings, adhesives, and/or rubber layers. Rubber layers may be applied by calender in a frictioning or a skimming process. The insert may be built up before applying, or layers of inserts may be applied individually in the belt building process to be described further below. The inserts may be built up on jacket 13 at the desired spacing, then applied to the belt mold or preformed.

Figure 10:
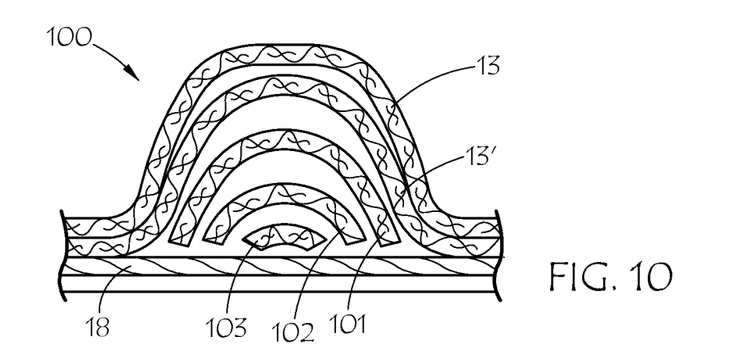
FIG. 10 is a partially fragmented side view of an eighth embodiment of the invention.
Figure 11:
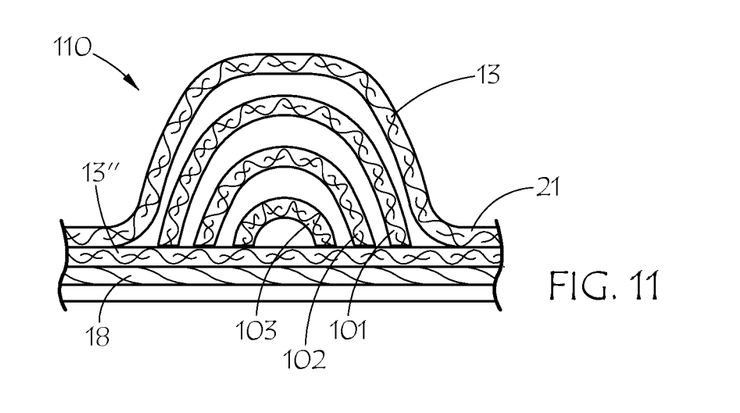
FIG. 11 is a partially fragmented side view of a ninth embodiment of the invention.

Two layers of jacket 13 could be used, as described for example in U.S. Pat. No. 4,632,665, and the inner layer could be used carry the inserts into the belt building process. FIGS. 10 and 11 illustrate two possible arrangements having two fabric layers in the land region 21. FIG. 10 shows first jacket 13 and second inner jacket layer 13" with three inserts 101, 102, and 103 in the tooth for belt 100. FIG. 11 shows first jacket 13 and second inner jacket 13" with inserts 101, 102, and 103, placed in between the two jackets in the teeth. Thus, one could have more than one fabric layer in the land region 21 if desired, along with or as extensions of one or more inserts in the tooth. One or more of said inserts could extend into the land region.

Figure 8:
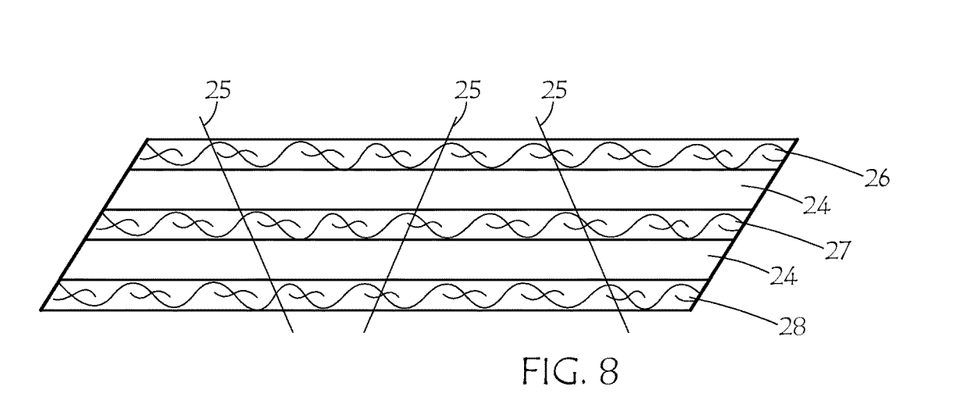
FIG. 8 is a side view of a laminate for use in the second embodiment.

One way to prepare the horizontal inserts of the second embodiment is to construct a laminate with the desired number of insert layers and rubber layers, and then cut the laminate at an angle repeatedly to make the desired tooth inserts. FIG. 8 illustrates this process. In FIG. 8, fabric layers 26, 27, 28 are laminated with rubber layers 24. Cuts 25 result in four trapezoidal inserts with three fabric layers each. The outer jacket would still need to be pre-formed and some rubber would still need to flow through the cord to fully fill the tooth. This could give horizontal inserts with no material in the land area. Any width of laminate could be used, and any number of cuts.

Figure 9:
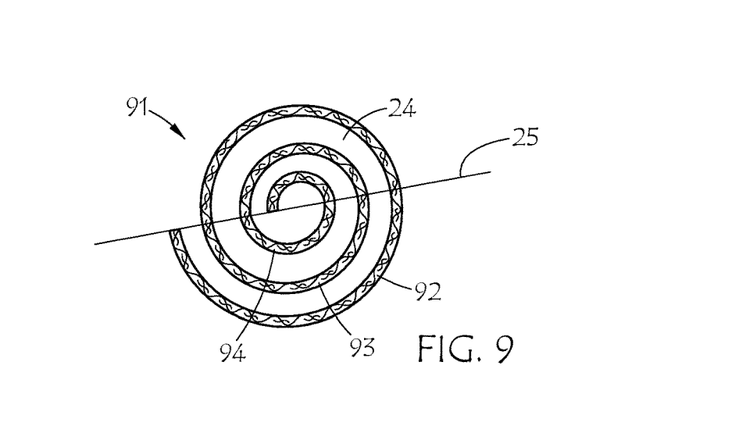
FIG. 9 is an end view of a laminate for use in the first embodiment.

One way to prepare the U-shaped inserts of the first embodiment is to construct a roll of fabric, e.g. by spirally rolling the fabric, and cut it in half. FIG. 9 illustrates this process. In FIG. 9, roll 91 includes rubber layer 24. Cutting at 25 results in 2 sets of U-shaped inserts 92, 93, and 94. The sheet of stock and fabric layered together could be wound around a suitable-diameter bar and then the sample cut in half and each half used as an insert in the tooth prior to winding cord. The outer jacket would still need to be pre-formed and some rubber would still need to flow through the cord to fully fill the tooth. This could give U-shaped inserts with no material in the land area.

Any elastomer matrix or rubber compound desired may be used in the tooth, back rubber, adhesion gum around the tensile cord, or elsewhere in the belt. For example, rubber compounds may be based on nitrile-butadiene elastomers, polychloroprene, natural rubber, butyl elastomers, ethylene-alpha-olefin elastomers, polyurethane, other ethylene-copolymer elastomers, and the like. Rubber compounds may include fillers, short fibers, plasticizers, antidegradants, process aids, curatives and so on as known in the art. Liquefied elastomers such as cast polyurethanes may be used.

The tensile member may be any known in the art, including for example, cords of fiberglass, carbon fiber, boron, aramid, nylon, polyester, PBO, or hybrids or the like. They may include binders, sizes or adhesive treatments as needed.

The synchronous belts of the invention may have any desired tooth profile, such as trapezoidal, curvilinear, helical, etc. The nominal belt size may be any desired size, although the benefits of reinforcing fabric inserts may be most significant in the larger belt sizes, from standard automotive sizes of 8-mm or 9.525-mm (0.375 inch) pitch up to the largest industrial belt sizes.

Any suitable manufacturing process known for rubber or elastomeric synchronous belts may be used. A preform method is preferred. In a preform method the jacket for covering the teeth is first formed to the approximate shape of the surface it is to cover. This may be done on the grooved mold that is to be used to form the entire belt, or on a separate profiled mold or machine developed for that purpose. The jacket may include a fabric and various treatments including finishes, adhesives, coatings, rubber layers or thermoplastic layers, as needed. Examples of preform methods of belt manufacturing are described in U.S. Pat. Nos. 3,250,653, 3,973,894, 4,235,119, 6,406,397, and 9,353,827. The preform method is particularly useful for jackets with limited or no stretch which cannot be shaped by the flow-through method. In this case, though, the preform method is advantageous in that it allows the inserts to be placed in the tooth cavities of the preformed jacket before the tensile member and other layers are applied. Initially flat inserts may be deformed somewhat during molding and cure processes. Curved inserts may also change shape somewhat during molding under pressure. The belt building process may be facilitated by formulating the rubber layers between the insert layers of fabric to be tacky. Tacky rubber may be formulated for example by utilizing or incorporating naturally tacky elastomers, specific tackifiers, low-molecular weight elastomer grades, plasticizers, or other known methods. Appropriate use of heat or solvents during building may also facilitate tackiness.

Figure 12:
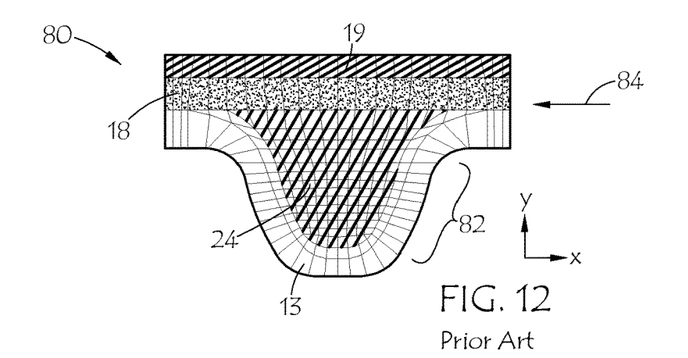
FIG. 12 is a 2-D wireframe FEA model of a synchronous belt tooth according to the prior art.

A single-tooth, numerical, finite-element model (FEA) was created to compare tooth stiffnesses of embodiments of the invention. One tooth edge was fixed and a displacement was applied at the cord line in the direction of the cord line. The belt back was constrained to only move in the direction of the cord line. The stiffness of the tooth was calculated as the displacement force over the displacement. The same approach was used for a model of each embodiment. FIG. 12 shows the control model, that is, a synchronous belt tooth 80 with jacket 13, tensile layer 18 and tooth rubber 24 with no fabric inserts or additional reinforcements. Belt back nodes 19 were constrained in the y-direction. Tooth flank nodes 82 were completely constrained. Tensile layer 18 was displaced in the direction indicated by arrow 84.

Figure 13:
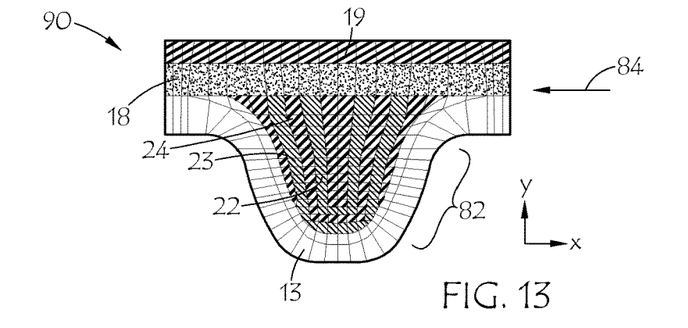
FIG. 13 is a 2-D wireframe FEA model of a synchronous belt tooth according to the first embodiment of the invention.

FIG. 13 shows the numerical model for the first embodiment, having two U-shaped inserts 22 and 23 in tooth 90 separated by tooth rubber 24, but generally parallel to the contour of the tooth. Otherwise, the model is identical to the control model of FIG. 12. The U-shaped or contoured inserts were given a very high stiffness value in order to explore the upper limits of the reinforcement effect.

Figure 14:
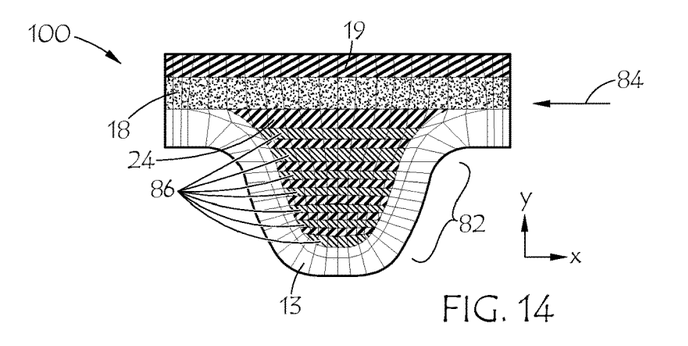
FIG. 14 is a 2-D wireframe FEA model of a synchronous belt tooth according to the second embodiment of the invention.

FIG. 14 shows the numerical model for belt tooth 100 with a plurality of horizontal reinforcing inserts 86. Seven inserts are used in FIG. 14, again to explore the upper limits of the tooth stiffening effect of the second embodiment.

Figure 15:
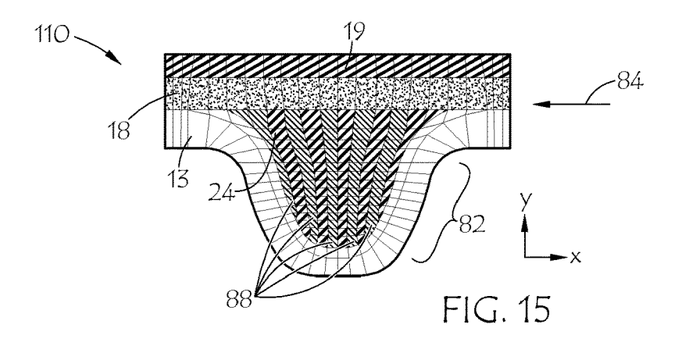
FIG. 15 is a 2-D wireframe FEA model of a synchronous belt tooth according to the third embodiment of the invention.

FIG. 15 shows the numerical model for belt tooth 110 with a plurality of vertical reinforcing inserts 88. Five inserts are used in FIG. 15 to explore the upper limits of the tooth stiffening effect of the third embodiment.

The calculated stiffness results were normalized by dividing by the calculated stiffness of the control model. The tooth stiffness results are shown TABLE 1. It can be seen that each of the three embodiments results in very significant stiffening of the belt tooth relative to the control. The first embodiment may make the tooth almost five times stiffer than the control. The second embodiment may more than double the tooth stiffness. The third embodiment may make the tooth more than four times stiffer than the control.

Thus, embodiments of the invention may provide significant enhancements to the stiffness of the teeth of a synchronous belt, which may improve the load capacity of the belt.

Herein, various directional/orientational terms including "vertical," "horizontal," "parallel," and "perpendicular" are used in an approximate sense and relative to the drawings or components of the drawings indicated by the context of the usage.

TABLE 1

| | Control | Embodiment 1 | Embodiment 2 | Embodiment 3 |
|---|---|---|---|---|
| Insert Type | None | Contour | Horizontal | Vertical |
| Relative Tooth Stiffness | 1.00 | 4.92 | 2.24 | 4.44 |

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A synchronous belt comprising:
   a tensile member layer having a tensile member embedded in an elastomeric body;
   a toothed surface comprising a plurality of regularly spaced, transverse teeth protruding from the body and lands there between wherein the teeth and lands alternate; and
   a jacket covering the toothed surface;
   wherein the teeth comprise a plurality of fabric insert layers that increase the stiffness of the tooth, the insert layers separated from each other by layers of an elastomer composition;
   and wherein said insert layers do not extend into the lands.

2. The synchronous belt of claim 1 wherein the plurality of fabric insert layers are separate pieces of fabric.

3. The synchronous belt of claim 2 wherein the plurality of fabric insert layers comprise a U-shape that is generally parallel to the contour of the tooth.

4. The synchronous belt of claim 2 wherein said plurality of fabric insert layers are planar and oriented generally parallel to the tensile member layer.

5. The synchronous belt of claim 2 wherein said plurality of fabric insert layers are planar and oriented generally perpendicular to the tensile member or inclined up to as much as the tooth flank surface with respect to the tensile member.

6. The synchronous belt of claim 1 wherein the plurality of fabric insert layers comprise a single piece of fabric.

7. The synchronous belt of claim 6 wherein the plurality of fabric insert layers are folded into a U-shape that is generally parallel to the contour of the tooth.

8. The synchronous belt of claim 6 wherein said plurality of fabric insert layers are connected by folds in the single piece of fabric, and are planar and oriented generally parallel to the tensile member layer.

9. The synchronous belt of claim 6 wherein said plurality of fabric insert layers are connected by folds in the single piece of fabric, are planar and oriented generally perpendicular to the tensile member or inclined up to as much as the tooth flank surface with respect to the tensile member.

10. The synchronous belt of claim 6 wherein said plurality of fabric insert layers are formed by spirally rolling the single piece of fabric.

* * * * *